(12) United States Patent
Qiao et al.

(10) Patent No.: US 9,290,643 B2
(45) Date of Patent: Mar. 22, 2016

(54) MODIFIED RUBBER MASTERBATCH, AND RUBBER COMPOSITION AND VULCANIZED RUBBER PRODUCED THEREFROM, AND THE PREPARATION PROCESSES FOR THEM

(71) Applicants: Jinliang Qiao, Beijing (CN); Yuexin Cong, Shandong (CN); Xiaohong Zhang, Beijing (CN); Ying Li, Shandong (CN); Jianming Gao, Beijing (CN); Qianmin Zhang, Shandong (CN); Zhihai Song, Beijing (CN); Yanling Sun, Shandong (CN); Jinmei Lai, Beijing (CN); Peijun Song, Shandong (CN); Chuanlun Cai, Beijing (CN); Guoxun Zhao, Shandong (CN); Hongbin Zhang, Beijing (CN); Guicun Qi, Beijing (CN); Ya Wang, Beijing (CN); Binghai Li, Beijing (CN)

(72) Inventors: Jinliang Qiao, Beijing (CN); Yuexin Cong, Shandong (CN); Xiaohong Zhang, Beijing (CN); Ying Li, Shandong (CN); Jianming Gao, Beijing (CN); Qianmin Zhang, Shandong (CN); Zhihai Song, Beijing (CN); Yanling Sun, Shandong (CN); Jinmei Lai, Beijing (CN); Peijun Song, Shandong (CN); Chuanlun Cai, Beijing (CN); Guoxun Zhao, Shandong (CN); Hongbin Zhang, Beijing (CN); Guicun Qi, Beijing (CN); Ya Wang, Beijing (CN); Binghai Li, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 14/354,233

(22) PCT Filed: Oct. 26, 2012

(86) PCT No.: PCT/CN2012/083574
§ 371 (c)(1),
(2) Date: Apr. 25, 2014

(87) PCT Pub. No.: WO2013/060288
PCT Pub. Date: May 2, 2013

(65) Prior Publication Data
US 2014/0296439 A1    Oct. 2, 2014

(30) Foreign Application Priority Data

Oct. 26, 2011 (CN) .......................... 2011 1 0330561
Oct. 26, 2011 (CN) .......................... 2011 1 0330604
Jul. 3, 2012 (CN) .......................... 2012 1 0229274
Jul. 3, 2012 (CN) .......................... 2012 1 0229510
Jul. 3, 2012 (CN) .......................... 2012 1 0229516

(51) Int. Cl.
C08L 21/00 (2006.01)
C08L 9/02 (2006.01)
C08L 7/00 (2006.01)
C08L 9/00 (2006.01)
C08L 9/06 (2006.01)
C08F 20/44 (2006.01)
B60C 1/00 (2006.01)

(52) U.S. Cl.
CPC ................. *C08L 9/02* (2013.01); *B60C 1/0016* (2013.04); *C08F 20/44* (2013.01); *C08L 7/00* (2013.01); *C08L 9/00* (2013.01); *C08L 9/06* (2013.01); *C08L 21/00* (2013.01); *C08L 2205/22* (2013.01)

(58) Field of Classification Search
CPC ............. C08L 21/00; C08L 9/02; C08L 7/00; C08L 9/00; C08L 9/06; C08L 2205/22; C08F 20/44; B60C 1/0016
USPC .......................................... 525/232, 233, 241
See application file for complete search history.

(56) References Cited

U.S. PATENT DOCUMENTS 5,395,891 A    3/1995    Obrecht et al.
(Continued)

FOREIGN PATENT DOCUMENTS

CN    1342183 A    3/2002
(Continued)

OTHER PUBLICATIONS

Extended European Search Report for European Patent Application No. 12844199.5 mailed Jul. 30, 2015.
(Continued)

*Primary Examiner* — Nathan M Nutter
(74) *Attorney, Agent, or Firm* — Finnegan, Henderson, Farabow, Garrett & Dunner, LLP

(57) ABSTRACT

The present application relates to a modified rubber masterbatch and preparation method thereof, rubber composition prepared therewith and vulcanized rubber and preparation method thereof. The modified rubber component comprises uncrosslinked rubber and rubber particles having crosslinked structure dispersed therein, wherein the rubber particles having crosslinked structure are synthetic rubber particles and/or natural rubber particles, have an average particle size of 20-500 nm and a gel content of 60% by weight or higher, and wherein the uncrosslinked rubber is styrene-butadiene rubber. The weight ratio of the rubber particles having crosslinked structure to the uncrosslinked rubber is greater than 20:80 and less than or equal to 80:20. The rubber composition comprises a blend of modified rubber component and base rubber, in which the modified rubber masterbatch is present in an amount of 1 to 70 parts by weight, relative to per 100 parts by weight of the base rubber. The vulcanized rubber of the rubber composition has not only low rolling resistance and excellent wet skid resistance, but also excellent wear resistance, and thus can be used for producing high performance tread rubber.

26 Claims, No Drawings

(56) References Cited

U.S. PATENT DOCUMENTS

| | | | |
|---|---|---|---|
| 6,127,488 | A | 10/2000 | Obrecht et al. |
| 6,372,857 | B1 | 4/2002 | Obrecht et al. |
| 6,399,706 | B1 | 6/2002 | Obrecht et al. |
| 6,605,671 | B2 * | 8/2003 | Obrecht .................. 525/194 |
| 6,620,866 | B1 | 9/2003 | Obrecht et al. |
| 6,737,478 | B2 | 5/2004 | Obrecht et al. |
| 6,858,675 | B1 | 2/2005 | Taguchi et al. |
| 2001/0006995 | A1 * | 7/2001 | Obrecht et al. ............ 525/123 |
| 2002/0077414 | A1 | 6/2002 | Obrecht |
| 2003/0008954 | A1 | 1/2003 | Tadaki et al. |
| 2003/0088036 | A1 | 5/2003 | Huang et al. |
| 2007/0167555 | A1 | 7/2007 | Amino et al. |
| 2010/0197829 | A1 | 8/2010 | Obrecht |

FOREIGN PATENT DOCUMENTS

| | | |
|---|---|---|
| CN | 101787148 | 7/2010 |
| CN | 102050972 A | 5/2011 |
| CN | 102050973 A | 5/2011 |
| CN | 103073759 A | 5/2013 |
| CN | 103073760 A | 5/2013 |
| EP | 1 149 867 | 10/2001 |
| EP | 1 621 571 A1 | 2/2006 |
| EP | 1 902 865 A1 | 3/2008 |

OTHER PUBLICATIONS

Wang et al., "NR-carbon black master batch produced by continuous liquid phase compounding process," *Tyre Industry*, (24): 135-143 (2004).

* cited by examiner

MODIFIED RUBBER MASTERBATCH, AND RUBBER COMPOSITION AND VULCANIZED RUBBER PRODUCED THEREFROM, AND THE PREPARATION PROCESSES FOR THEM

TECHNICAL FIELD

The present invention generally relates to the rubber field, and specifically, to a modified rubber masterbatch and its preparation process, to a rubber composition prepared by the modified rubber masterbatch and its preparation process, and to a vulcanized rubber.

BACKGROUND

In modern life, automobile is gradually becoming an indispensable tool. However, the power of automobile derives substantially from the fossil oil which is limited. At the same time, the rapid development of the automobile industry also encounters the pressure of reducing carbon dioxide emission. Therefore, the demand of reducing vehicle fuel consumption has become more and more urgent. By reducing fuel consumption, not only vehicle operating cost but also carbon dioxide emission can be reduced, and the stress of oil resource can be relieved. Besides design factors of automobiles, the rolling resistance of tire is also an important factor influencing the vehicle fuel consumption. The fuel consumption caused by tire rolling resistance comprises 14-17% of total vehicle fuel consumption. It is generally believed that the fuel consumption may be reduced by a factor of 1-2% relative to per 10% reduction in tire rolling resistance. Thus, reducing tire rolling resistance is regarded as one of the most important measures for reducing fuel consumption.

However, thorny problems have been encountered in the research for reducing the rolling resistance of tire rubber material (mainly tread rubber), i.e. the so-called "magic triangle" problem in which rolling resistance, wet skid resistance and wear resistance are mutually restricted. Simply increasing the amount of the softener can improve the wet skid resistance of tire, but wear resistance decreases and rolling resistance increases. Increasing the amount of reinforcing filler (carbon black or silica) can reduce rolling resistance to some extent, but the reinforcing filler is difficult to be uniformly dispersed in rubber which may lead to the deterioration of wet skid resistance. Increasing the amount of vulcanizing agent (i.e. increasing crosslinking density) leads to the same effect as obtained upon increasing the amount of reinforcing filler, i.e. reducing rolling resistance while deteriorating wet skid resistance. In order to achieve the balance of the above three properties, besides the attempt of optimizing the designs of tire structure, extensive studies have been carried out worldwide on the formulation of rubber (mainly tread rubber). On one hand, efforts are focused on synthesizing suitable rubber raw materials such as solution polymerized styrene-butadiene rubber (SSBR), transpolyisoprene (TPI), styrene-isoprene-butadiene rubber (SIBR), high vinyl butadiene rubber (HVBR) etc. On the other hand, efforts have been paid on finding modifiers and practical formulations with better comprehensive performances. Some progresses have been achieved in the formulation research. Representative examples include the combination of solution polymerized styrene-butadiene rubber (SSBR) etc. with carbon black and silica or inversion carbon black system. This system is characterized by substantially fixed main formulation with only variable reinforcing filler, and by simplicity of industrialization. The disadvantages of this system lie in that more silane coupling agents and heavy equipment load are required during the compounding process, and the wear resistance of the vulcanized rubber is not satisfactory.

The rubber gels produced by direct polymerization process or chemical crosslinking process using peroxides may improve the properties of vulcanized rubber if properly formulated. For example, European patent EP405216 and German patent DE4220563 respectively report that the wear resistance and temperature rise by fatigue of the vulcanized rubber were improved by adding neoprene rubber gel or butadiene rubber gel into the rubber composition respectively. However, the wet skid resistance decreases.

Therefore, many patents started to improve the properties of vulcanized rubber by using modified rubber gel. For example, a surface-modified butadiene rubber gel and styrene-butadiene rubber gel were used in U.S. Pat. No. 6,184,296 (the latex particles in the gel has a swelling index of 4-5, and a particle size of 60-450 nm). As a result, the rolling resistance of the vulcanized rubber of natural rubber (NR) formulation system was reduced without any deterioration in strength properties.

In U.S. Pat. No. 6,133,364, chloromethyl styrene was grafted onto the surface of styrene-butadiene rubber gel, and then the modified rubber gel was used in a NR formulation system. As a result, the rolling resistance of the vulcanized rubber was reduced and wet skid resistance is improved.

In U.S. Pat. No. 6,207,757, a chloromethyl styrene modified styrene-butadiene rubber gel was used to achieve the effect of lowering the rolling resistance of the vulcanized rubber in NR formulation system, and meanwhile, improving the wet grip and maintained longevity of tire.

In U.S. Pat. No. 6,242,534, styrene-butadiene rubber gels containing respectively carboxylate and amino group were used together in a NR formulation system. The rolling resistance of the vulcanized rubber system was reduced and the wet skid resistance was enhanced, while the stress at a given elongation was significantly increased.

In European patent EP1431075, a styrene-butadiene rubber gel and a plasticized starch were used to improve the properties of a silica system comprising a combination of styrene-butadiene rubber (SBR) and butadiene rubber (BR). As a result, wear resistance was improved, rolling resistance was reduced, and the specific gravity of the vulcanized rubber was low.

In U.S. Pat. No. 6,699,935, copolymerization modified styrene-butadiene rubber gel was used for conferring low rolling resistance as well as excellent wet skid resistance and wear resistance on the modified styrene-butadiene rubber formulation system.

The rubber gels mentioned in the patent references described above are all crosslinked by chemically crosslinking processes requiring both expensive crosslinking monomers and high energy consumption, and relating mainly to the natural rubber formulation system or silica system of the styrene-butadiene rubber and modified styrene-butadiene rubber formulation system. What is important is that the simultaneous improvements in rolling resistance, wet skid resistance and wear resistance can be obtained only after the crosslinked rubber gel has been modified. Although some of these patents disclose the particle size of the rubber gels, neither of them discloses whether or not a dispersion with initial primary particle size can be realized and whether or not a modification effect via the nano-scale rubber gel can be really achieved when these rubber gels are dispersed into the vulcanized rubber.

DISCLOSURE OF THE INVENTION

Directing to the problems presented in the art, one of the objects of the present invention is to provide a modified rubber masterbatch, also referred as modified rubber component. The vulcanized rubber of the rubber composition produced from such masterbatchs shows not only low rolling resistance and excellent wet skid resistance, but also excellent wear resistance, and thus can be used as excellent vehicle tire tread rubber.

Another object of the present invention is to provide a preparation process for the modified rubber masterbatch.

Still another object of the present invention is to provide a rubber composition comprising the said modified rubber masterbatch.

The fourth object of the present invention is to provide a preparation process for the said rubber composition.

The fifth object of the present invention is to provide a vulcanized rubber of the said rubber composition.

The present invention further relates to the following technical embodiments:

1. A modified rubber masterbatch, comprising an uncrosslinked rubber and rubber particles having crosslinked structure dispersed therein, wherein the rubber particles having crosslinked structure are synthetic rubber particles and/or natural rubber particles with an average particle size of 20 to 500 nm, preferably 50 to 200 nm, more preferably 70 to 200 nm, and a gel content of 60% by weight or higher, preferably 75% by weight or higher, and the uncrosslinked rubber is a styrene-butadiene rubber; and wherein the weight ratio of the rubber particles having crosslinked structure to the uncrosslinked rubber is greater than 20:80 and less than or equal to 80:20.

2. The modified rubber masterbatch according to the embodiment 1, characterized in that the rubber particles having crosslinked structure are one or more selected from the group consisting of natural rubber particles, styrene-butadiene rubber particles, carboxylated styrene-butadiene rubber particles, nitrile butadiene rubber particles, carboxylated nitrile butadiene rubber particles, chloroprene rubber particles, polybutadiene rubber particles, silicone rubber particles, acrylic rubber particles, styrene-butadiene-vinylpyridine rubber particles; preferably one or more selected from the group consisting of nitrile butadiene rubber particles, styrene-butadiene-vinylpyridine rubber particles, styrene-butadiene rubber particles, carboxylated styrene-butadiene rubber particles; more preferably one or more selected from the group consisting of styrene-butadiene-vinylpyridine rubber particles, nitrile butadiene rubber particles; most preferably nitrile butadiene rubber particles.

3. The modified rubber masterbatch according to the embodiment 1 or 2, characterized in that the rubber particles having crosslinked structure are of homogeneous structure.

4. The modified rubber masterbatch according to any one of the embodiments 1 to 3, characterized in that the weight ratio of the rubber particles having crosslinked structure to the uncrosslinked rubber is 30:70-80:20; preferably 40:60-80:20.

5. The modified rubber masterbatch according to any one of the embodiments 1 to 4, characterized in that the modified rubber masterbatch is obtained by mixing the components comprising the uncrosslinked rubber latex and a latex of the rubber particles having crosslinked structure till homogeneous and then coagulating them, wherein the latex of the rubber particles having crosslinked structure is a rubber latex obtained by radiation crosslinking.

6. A preparation process for the modified rubber masterbatch according to any one the embodiments 1 to 5, comprising the following steps:

(1) subjecting a latex of synthetic rubber and/or natural rubber to the radiation crosslinking and thereby providing the synthetic rubber and/or natural rubber particles in the latex with a crosslinked structure, the said gel content and meanwhile an average particle size fixed in the said average particle size range;

(2) mixing till homogeneous the above radiation crosslinked latex of the synthetic rubber and/or natural rubber with a latex of the uncrosslinked rubber according to the said weight ratio of the rubber particles having crosslinked structure to the uncrosslinked rubber;

(3) coagulating the above mixed latices to obtain the said modified rubber masterbatch.

7. The preparation process according to the embodiment 6, characterized in that the latex of synthetic rubber and/or natural rubber latex is one or more selected from the group consisting of natural rubber latex, styrene-butadiene rubber latex, carboxylated styrene-butadiene rubber latex, nitrile butadiene rubber latex, carboxylated nitrile butadiene rubber latex, chloroprene rubber latex, polybutadiene rubber latex, silicone rubber latex or acrylic rubber latex, styrene-butadiene-vinylpyridine rubber latex and the like; preferably one or more selected from the group consisting of nitrile butadiene rubber latex, styrene-butadiene-vinylpyridine rubber latex, styrene-butadiene rubber latex, carboxylated styrene-butadiene rubber latex; more preferably one or more selected from the group consisting of styrene-butadiene-vinylpyridine rubber latex, nitrile butadiene rubber latex; most preferably nitrile butadiene rubber latex.

8. A rubber composition, comprising a blend of the modified rubber masterbatch according to any one of the embodiments 1 to 5 and a base rubber, wherein the modified rubber masterbatch is present in an amount of 1 to 70 parts by weight, preferably 1 to 40 parts by weight and more preferably 1 to 30 parts by weight, relative to per 100 parts by weight of the base rubber.

9. The rubber composition according to the embodiment 8, characterized in that the base rubber is one or more selected from the group consisting of natural rubber, modified natural rubber, synthetic rubber; preferably one or more selected from the group consisting of natural rubber, styrene-butadiene copolymer produced by emulsion polymerization process or its oil extended products, a styrene-butadiene copolymer produced by solution polymerization process or its oil extended products and polybutadiene rubber having any structure produced from butadiene as monomer by any polymerization process known in the art or its oil extended products and the like; more preferably any one or more selected from the group consisting of styrene-butadiene copolymer produced by emulsion polymerization process or its oil extended products, styrene-butadiene copolymer produced by solution polymerization process or its oil extended products and polybutadiene rubber having any structure produced from butadiene as monomer by any polymerization process known in the art or its oil extended products and the like.

10. A preparation process for the rubber composition according to the embodiment 8 or 9, comprising a step of compounding the modified rubber masterbatch and the base rubber in the described amounts to obtain a rubber composition.

11. The preparation process according to the embodiment 10, characterized in that the preparation process for the modified rubber masterbatch comprising the following steps:

(1) subjecting a latex of synthetic rubber and/or natural rubber to the radiation crosslinking and thereby providing the synthetic rubber and/or natural rubber particles in the latex with a crosslinked structure, the said gel content and meanwhile an average particle size fixed in the said average particle size range;

(2) mixing till homogeneous the above radiation crosslinked latex of the synthetic rubber and/or natural rubber with a latex of the uncrosslinked rubber according to the said weight ratio of the rubber particles having crosslinked structure to the uncrosslinked rubber;

(3) coagulating the above mixed latices to obtain the said modified rubber masterbatch.

12. A vulcanized rubber produced from the rubber composition according to the embodiment 8 or 9.

I. Modified Rubber Masterbatch

International patent application WO 01/40356 submitted by the applicant on Sep. 18, 2000 (Priority dated Dec. 3, 1999) and International patent application WO 01/98395 submitted by the applicant on Jun. 15, 2001 (Priority dated Jun. 15, 2000) disclosed a fully vulcanized powdery rubber. It was disclosed that, after rubber latex is radiation crosslinked, the particle size of latex particles is fixed and no adhesion or coagulation will occur in the subsequent drying process owing to the certain gel content in the latex particles (rubber particles) in the rubber latex resulted from the radiation crosslinking. In the researches, the inventors had found that by mixing such radiation crosslinked rubber latex with an uncrosslinked styrene-butadiene rubber latex and then coagulating them, a rubber composition of styrene-butadiene rubber modified by crosslinked rubber particles will be obtained. Since no adhesion and coagulation will occur among the radiation crosslinked rubber particles having crosslinked structure, while coagulation may occur among the latex particles of common uncrosslinked styrene-butadiene rubber latex, rubber particles having crosslinked structure will be dispersed with their initial particle size in the matrix of the crude rubber obtained after the coagulation of the uncrosslinked styrene-butadiene rubber latex and the uniformity of the dispersion is better than that of the mixture obtained by directly compounding fully vulcanized powdery rubber and crude rubber. Thereby, a modified rubber masterbatch is obtained.

The obtained modified rubber masterbatch, as a solid modifier, is added into uncrosslinked block rubber by compounding them with an internal mixer, a two roller mill or a screw extruder or the like to form a compounded rubber. Such obtained compounded rubber may also ensure a microstructure in which the radiation crosslinked rubber particles having crosslinked structure are dispersed with the defined particle size range in the uncrosslinked rubber matrix. The composition is further compounded with the conventionally used rubber processing additives, and after vulcanization an vulcanized rubber is obtained. Since the radiation crosslinked rubber particles have already been of the crosslinked structure without taking into consideration the vulcanization of the dispersion phase, thereby the problem of covulcanizing a composition comprising different rubbers may be solved. Meanwhile, the radiation crosslinked rubber particles having crosslinked structure are homogeneously dispersed with the very small initial particle size in the vulcanized rubber, which enables the finally obtained vulcanized rubber have both low rolling resistance and excellent wet skid resistance, as well as excellent wear resistance.

In more detail, the modified rubber masterbatch of the present invention comprises an uncrosslinked rubber and rubber particles having crosslinked structure dispersed therein. The uncrosslinked rubber is the continuous phase, and the rubber particles having crosslinked structure is the dispersed phase. The weight ratio of the rubber particles having crosslinked structure to the uncrosslinked rubber is greater than 20:80 and less than or equal to 80:20, preferably 30:70-80:20, more preferably 40:60-80:20.

The rubber particles having crosslinked structure are synthetic rubber particles and/or natural rubber particles, and may be e.g. one or more selected from the group consisting of natural rubber particles, styrene-butadiene rubber particles, carboxylated styrene-butadiene rubber particles, nitrile butadiene rubber particles, carboxylated nitrile butadiene rubber particles, chloroprene rubber particles, polybutadiene rubber particles, silicone rubber particles or acrylic rubber particles, styrene-butadiene-vinylpyridine rubber particles and the like; preferably one or more selected from the group consisting of nitrile butadiene rubber particles, styrene-butadiene-vinylpyridine rubber particles, styrene-butadiene rubber particles, carboxylated styrene-butadiene rubber particles; more preferably one or more selected from the group consisting of styrene-butadiene-vinylpyridine rubber particles, nitrile butadiene rubber particles; most preferably nitrile butadiene rubber particles. The said rubber particles have an average particle size of 20 to 500 nm, preferably 50 to 200 nm, more preferably 70 to 200 nm, and a gel content of 60% by weight or higher, preferably 75% by weight or higher, more preferably 80% by weight or higher. The rubber particles having crosslinked structure in the above mentioned modified rubber masterbatch are of a homogeneous structure, and don't require any grafting modification or surface modification. The uncrosslinked rubber may be selected from various styrene-butadiene rubbers known in the art, preferably emulsion polymerized styrene-butadiene rubbers known in the art, i.e. a styrene-butadiene copolymer prepared via emulsion polymerization.

The preparation process of the modified rubber masterbatch of the present invention comprises mixing the components containing the uncrosslinked rubber latex and crosslinked rubber latex having the rubber particles with crosslinked structure till homogeneous, and then coagulating them, wherein the crosslinked rubber latex having the rubber particles with crosslinked structure is a rubber latex obtained after radiation crosslinking.

Concretely, the preparation process of the said modified rubber masterbatch comprises the following steps:

(1) subjecting a rubber latex to the radiation crosslinking and thereby providing the rubber particles in the latex with a crosslinked structure, the said gel content and meanwhile an average particle size fixed in the said average particle size range;

(2) mixing till homogeneous the above radiation crosslinked rubber latex with a latex of the uncrosslinked rubber according to the said weight ratio of the rubber particles having crosslinked structure to the uncrosslinked rubber;

(3) coagulating the above mixed latices to obtain the said modified rubber masterbatch.

In the above described preparation process for the modified rubber masterbatch, the latex of the uncrosslinked rubber may be a styrene-butadiene rubber latex. The styrene-butadiene rubber latex is of the synthetic rubber latex commonly known in the art, including those emulsion polymerized styrene-butadiene latex produced by emulsion polymerization process in the art, and the latex obtained by emulsifying styrene-butadiene block rubber obtained according to any process known in the art, preferably styrene-butadiene latex produced directly by the emulsion polymerization process known in the art. The rubber latex prior to the radiation crosslinking may be a natural rubber and/or a synthetic rubber latex produced by synthetic techniques known in the art, for example, may be one or more selected from the group consisting of natural rubber latex, styrene-butadiene rubber latex, carboxylated styrene-butadiene rubber latex, nitrile butadiene rubber latex, carboxylated nitrile butadiene rubber latex, chloroprene rubber latex, polybutadiene rubber latex, silicone rubber latex or acrylic rubber latex, styrene-butadiene-vinylpyridine rubber latex and the like; preferably one or more selected from the group consisting of nitrile butadiene rubber latex, styrene-butadiene-vinylpyridine rubber latex, styrene-butadiene rubber latex, carboxylated styrene-butadiene rubber latex; more preferably one or more selected from the group consisting of styrene-butadiene-vinylpyridine rubber latex, nitrile butadiene rubber latex; most preferably nitrile butadiene rubber latex. The weight ratio of the solid content of the radiation crosslinked rubber latex to the solid content of the styrene-butadiene rubber latex is greater than 20:80 and less than or equal to 80:20, preferably 30:70-80:20, more preferably 40:60-80:20.

The radiation crosslinking of the rubber latex in the above step (1) is conducted using the same radiation crosslinking process for rubber latex as that for fully vulcanized powdery rubber disclosed in International patent application WO 01/40356 (having the priority dated Dec. 3, 1999). The rubber latex obtained after radiation crosslinking is also the same as the rubber latex after radiation but prior to dryness, as disclosed in WO 01/40356.

More specifically, a crosslinking additive may be optionally used in the rubber latex. The crosslinking additive used may be selected from mono-, di-, tri-, tetra- or multi-functional crosslinking additives and any combination thereof. Examples of the monofunctional crosslinking additive include, but are not limited to, octyl (meth)acrylate, isooctyl (meth)acrylate, glycidyl (meth)acrylate. Examples of the difunctional crosslinking additive include, but are not limited to, 1,4-butandiol di(meth)acrylate, 1,6-hexandiol di(meth)acrylate, diethylene glycol di(meth)acrylate, triethylene glycol di(meth)acrylate, neopentyl glycol di(meth)acrylate, divinyl benzene. Examples of the trifunctional crosslinking additive include, but are not limited to, trimethylolpropane tri(meth)acrylate, pentaerythritol tri(meth)acrylate. Examples of the tetrafunctional crosslinking additive include, but are not limited to, pentaerythritol tetra(meth)acrylate, ethoxylated pentaerythritol tetra(meth)acrylate. Examples of the multi-functional crosslinking additive include, but are not limited to, dipentaerythritol penta(meth)acrylate. As used herein, the term "(meth)acrylate" means acrylate or methacrylate. Such crosslinking additive can be used alone or in any combination thereof, as long as it facilitates the radiation crosslinking.

The above crosslinking additive is generally added in the amount of 0.1 to 10% by weight, preferably 0.5 to 9% by weight, more preferably 0.7 to 7% by weight, relative to the dry weight of the rubber in the latex.

The high-energy ray source for the radiation is selected from cobalt source, UV rays or high-energy electron accelerator, preferably cobalt source. The radiation dose may be in the range of 0.1-30 Mrad, preferably from 0.5 to 20 Mrad. Generally, the radiation dose shall be such that the gel content of rubber particles in the rubber latex after the radiation crosslinking is up to 60% by weight or higher, preferably 75% by weight or higher, and more preferably 80% by weight or higher.

Thus, in the modified rubber masterbatch, which is obtained by mixing such a radiation crosslinked rubber latex with common uncrosslinked styrene-butadiene rubber latex and then coagulating them, the dispersed phase of rubber particles dispersed in the continuous phase of the uncrosslinked crude styrene-butadiene rubber has the same characteristics as the fully vulcanized powdery rubber disclosed in WO 01/40356. That is to say, such rubber particles having crosslinked structure are the rubber particles having a gel content up to 60% by weight or higher, preferably 75% by weight or higher and more preferably 80% by weight or higher. Each particle of such rubber particles having crosslinked structure is homogeneous, that is to say, the individual particle is uniform with respect the composition, and a heterogeneous phenomenon, such as lamellar phase and phase-separation etc. within the particles is not detectable with microscopy available nowadays. Owing to the radiation crosslinking of the corresponding rubber latex, the particle size of the rubber particle having crosslinked structure is fixed consistent with that of latex particles in the initial rubber latex. The rubber particles in the initial rubber latex (latex particles) generally have an average particle size of 20-500 nm, preferably 50-200 nm, more preferably 70-200 nm. Accordingly, the radiation crosslinked rubber particles having crosslinked structure generally have an average particle size of 20-500 nm, preferably 50-200 nm, more preferably 70-200 nm. Owing to the homogeneously mixing of the two latices to be coagulated in this process, the rubber particles in the radiation crosslinked rubber latex have already been crosslinked and thereby possess a certain gel content, which renders the adhesion or coagulation impossible during the coagulation process of the latex. Moreover, such particles can be dispersed uniformly in the uncrosslinked styrene-butadiene rubber. Therefore, in the finally obtained modified rubber masterbatch, the rubber particles having crosslinked structure as the dispersed phase have an average particle size also in the range of 20-500 nm, preferably 50-200 nm and more preferably 70-200 nm.

The modified rubber masterbatch of the present invention is produced by mixing the uncrosslinked rubber latex with the radiation crosslinked rubber latex in said weight ratio and coagulating them. During the preparation process, the equipment for mixing these two rubber latices in the mixing step is namely those commonly used mixing equipments in the art and may be selected from mechanical mixing equipments such as high speed mixer or kneader. The conditions and equipments for the coagulation of the latices are those commonly used for latex coagulation in the rubber industry.

II. Rubber Composition

International patent application WO 01/40356 submitted by the applicant on Sep. 18, 2000 (Priority dated Dec. 3, 1999) and International patent application WO 01/98395 submitted by the applicant on Jun. 15, 2001 (Priority dated Jun. 15, 2000) disclosed a fully vulcanized powdery rubber. It was disclosed that, after rubber latex is radiation crosslinked, the particle size of latex particles is fixed and no adhesion or coagulation will occur in the subsequent drying process owing to the certain gel content in the latex particles (rubber particles) in the rubber latex resulted from the radiation crosslinking. In the researches, the inventors had found that by mixing such radiation crosslinked rubber latex with an uncrosslinked styrene-butadiene rubber latex and then coagulating them, a rubber composition of styrene-butadiene rubber modified by crosslinked rubber particles will be obtained. Since no adhesion and coagulation will occur among the radiation crosslinked rubber particles having crosslinked structure, while coagulation may occur among the latex particles of common uncrosslinked styrene-butadiene rubber latex, rubber particles having crosslinked structure will be dispersed with their initial particle size in the matrix of the crude rubber obtained after the coagulation of the uncrosslinked styrene-butadiene rubber latex and the uniformity of the dispersion is better than that of the mixture obtained by directly compounding fully vulcanized powdery rubber and crude rubber. Thereby, a modified rubber composition is obtained.

The obtained modified rubber masterbatch, as a solid modifier, is added into uncrosslinked block rubber by compounding them with an internal mixer, a two roller mill or a screw extruder or the like to form a compounded rubber. Such obtained compounded rubber may also ensure a microstructure in which the radiation crosslinked rubber particles having crosslinked structure are dispersed with the defined particle size range in the uncrosslinked rubber matrix. The composition is further compounded with the conventionally used rubber processing additives, and after vulcanization an vulcanized rubber is obtained. Since the radiation crosslinked rubber particles have already been of the crosslinked structure without taking into consideration the vulcanization of the dispersion phase, thereby the problem of covulcanizing a composition comprising different rubbers may be solved. Meanwhile, the radiation crosslinked rubber particles having crosslinked structure are homogeneously dispersed with the very small initial particle size in the vulcanized rubber, which enables the finally obtained vulcanized rubber have both low rolling resistance and excellent wet skid resistance, as well as excellent wear resistance.

Specifically, the rubber composition according to the present invention comprises a blend of a modified rubber component and a base rubber, wherein the modified rubber component is present in an amount of 1 to 70 parts by weight, preferably 1 to 40 parts by weight, more preferably 1 to 30 parts by weight, relative to per 100 parts by weight of the base rubber.

The base rubber may be one or more selected from the group consisting of natural rubber, modified natural rubber, synthetic rubber; preferably the synthetic rubbers or natural rubbers known in the art which are suitable for preparing automobile tyres, especially automobile tread rubber. For example, the base rubber may be one or more selected from the group consisting of natural rubber, styrene-butadiene copolymer produced by emulsion polymerization process or its oil extended products, styrene-butadiene copolymer produced by solution polymerization process or its oil extended products, polybutadiene rubber of any structure produced from butadiene as monomer by any polymerization process known in the art or its oil extended products, and the like; preferably one or more selected from the group consisting of styrene-butadiene copolymer produced by emulsion polymerization process or its oil extended products, styrene-butadiene copolymer produced by solution polymerization process or its oil extended products, polybutadiene rubber of any structure produced from butadiene as monomer by any polymerization process known in the art or its oil extended products and the like. In the preparation process for the above rubber composition, the modified rubber component comprises uncrosslinked rubber and rubber particles having crosslinked structure dispersed in the uncrosslinked rubber, and the weight ratio of the rubber particles having crosslinked structure to the uncrosslinked rubber is greater than 20:80 and less than or equal to 80:20, preferably 30:70-80:20; more preferably 40:60-80:20.

The uncrosslinked rubber may be various styrene-butadiene rubbers known in the art, preferably an emulsion polymerized styrene-butadiene rubber known in the art, i.e. a styrene-butadiene copolymer produced by emulsion polymerization process.

The rubber particles having crosslinked structure are synthetic rubber particles and/or natural rubber particles, for example, may be one or more selected from the group consisting of natural rubber particles, styrene-butadiene rubber particles, carboxylated styrene-butadiene rubber particles, nitrile butadiene rubber particles, carboxylated nitrile butadiene rubber particles, chloroprene rubber particles, polybutadiene rubber particles, silicone rubber particles or acrylic rubber particles, styrene-butadiene-vinylpyridine rubber particles and the like; preferably one or more selected from the group consisting of nitrile butadiene rubber particles, styrene-butadiene-vinylpyridine rubber particles, styrene-butadiene rubber particles, carboxylated styrene-butadiene rubber particles; more preferably one or more selected from the group consisting of nitrile butadiene rubber particles, styrene-butadiene-vinylpyridine rubber particles; most preferably nitrile butadiene rubber particles. The rubber particles having crosslinked structure have an average particle size of 20 to 500 nm, preferably 50 to 200 nm and more preferably 70 to 200 nm, and a gel content of 60% by weight or higher, preferably 75% by weight or higher and more preferably 80% by weight or higher. The rubber particles having crosslinked structure in the modified rubber component are of homogeneous structure, and have no graft modification or surface modification.

The preparation process of the modified rubber component of the present invention comprises mixing the components containing the uncrosslinked rubber latex and crosslinked rubber latex having the rubber particles with crosslinked structure till homogeneous, and then coagulating them, wherein the crosslinked rubber latex having the rubber particles with crosslinked structure is a rubber latex obtained after radiation crosslinking.

Concretely, the preparation process for the modified rubber component comprises the following steps:

(1) subjecting a rubber latex to the radiation crosslinking and thereby providing the rubber particles in the latex with a crosslinked structure, the said gel content and meanwhile an average particle size fixed in the said average particle size range;

(2) mixing till homogeneous the above radiation crosslinked rubber latex with a latex of the uncrosslinked rubber according to the said weight ratio of the rubber particles having crosslinked structure to the uncrosslinked rubber;

(3) coagulating the above mixed latices to obtain the said modified rubber component.

In the preparation process for the above modified rubber component, the uncrosslinked styrene-butadiene rubber latex is a synthetic rubber latex common in the art, including emulsion polymerized styrene-butadiene latex directly produced by emulsion polymerization process known in the art and latices obtained by emulsifying a styrene-butadiene block rubber produced by any preparation process known in the art; preferably the emulsion polymerized styrene-butadiene latex directly produced by the emulsion polymerization process known in the art. The rubber latex prior to the radiation crosslinking may be a natural rubber latex and/or a synthetic rubber latex produced by synthetic techniques known in the art, for example, may be one or more selected from the group consisting of natural rubber latex, styrene-butadiene rubber latex, carboxylated styrene-butadiene rubber latex, nitrile butadiene rubber latex, carboxylated nitrile butadiene rubber latex, chloroprene rubber latex, polybutadiene rubber latex, silicone rubber latex or acrylic rubber latex, styrene-butadiene-vinylpyridine rubber latex and the like; preferably one or more selected from the group consisting of nitrile butadiene rubber latex, styrene-butadiene-vinylpyridine rubber latex, styrene-butadiene rubber latex, carboxylated styrene-butadiene rubber latex; more preferably one or more selected from the group consisting of styrene-butadiene-vinylpyridine rubber latex, nitrile butadiene rubber latex; most preferably nitrile butadiene rubber latex. The weight ratio of the solid content of the radiation crosslinked rubber latex to the solid content of the styrene-butadiene rubber latex is greater than 20:80 and less than or equal to 80:20, preferably 30:70-80:20, more preferably 40:60-80:20.

The radiation crosslinking of the rubber latex in the above step (1) is conducted using the same radiation crosslinking process for rubber latex as that for fully vulcanized powdery rubber disclosed in International patent application WO 01/40356 (having the priority dated Dec. 3, 1999). The rubber latex obtained after radiation crosslinking is also the same as the rubber latex after radiation but prior to dryness, as disclosed in WO 01/40356.

More specifically, a crosslinking additive may be optionally used in the rubber latex. The crosslinking additive used may be selected from mono-, di-, tri-, tetra- or multi-functional crosslinking additives and any combination thereof. Examples of the monofunctional crosslinking additive include, but are not limited to, octyl (meth)acrylate, isooctyl (meth)acrylate, glycidyl (meth)acrylate. Examples of the difunctional crosslinking additive include, but are not limited to, 1,4-butandiol di(meth)acrylate, 1,6-hexandiol di(meth)acrylate, diethylene glycol di(meth)acrylate, triethylene glycol di(meth)acrylate, neopentyl glycol di(meth)acrylate, divinyl benzene. Examples of the trifunctional crosslinking additive include, but are not limited to, trimethylolpropane tri(meth)acrylate, pentaerythritol tri(meth)acrylate. Examples of the tetrafunctional crosslinking additive include, but are not limited to, pentaerythritol tetra(meth)acrylate, ethoxylated pentaerythritol tetra(meth)acrylate. Examples of the multi-functional crosslinking additive include, but are not limited to, dipentaerythritol penta(meth)acrylate. As used herein, the term "(meth)acrylate" means acrylate or methacrylate. Such crosslinking additive can be used alone or in any combination thereof, as long as it facilitates the radiation crosslinking.

The above crosslinking additive is generally added in the amount of 0.1 to 10% by weight, preferably 0.5 to 9% by weight, more preferably 0.7 to 7% by weight, relative to the dry weight of the rubber in the latex.

The high-energy ray source for the radiation is selected from cobalt source, UV rays or high-energy electron accelerator, preferably cobalt source. The radiation dose may be in the range of 0.1-30 Mrad, preferably from 0.5 to 20 Mrad. Generally, the radiation dose shall be such that the gel content of rubber particles in the rubber latex after the radiation crosslinking is up to 60% by weight or higher, preferably 75% by weight or higher, and more preferably 80% by weight or higher.

Thus, in the modified rubber component, which is obtained by mixing such radiation crosslinked rubber latex with common uncrosslinked styrene-butadiene rubber latex and then coagulating them, the dispersed phase of rubber particles dispersed in the continuous phase of the uncrosslinked crude styrene-butadiene rubber has the same characteristics as the fully vulcanized powdery rubber disclosed in WO 01/40356. That is to say, such rubber particles having crosslinked structure are the rubber particles having a gel content up to 60% by weight or higher, preferably 75% by weight or higher and more preferably 80% by weight or higher. Each particle of such rubber particles having crosslinked structure is homogeneous, that is to say, the individual particle is uniform with respect to the composition, and a heterogeneous phenomenon, such as lamellar phase and phase-separation etc. within the particles is not detectable with microscopy available nowadays. Owing to the radiation crosslinking of the corresponding rubber latex, the particle size of the rubber particle having crosslinked structure is fixed consistent with that of latex particles in the initial rubber latex. The rubber particles in the initial rubber latex (latex particles) generally have an average particle size of 20-500 nm, preferably 50-200 nm, more preferably 70-200 nm. Accordingly, the radiation crosslinked rubber particles having crosslinked structure generally have an average particle size of 20-500 nm, preferably 50-200 nm, more preferably 70-200 nm. Due to the homogeneously mixing of the two latices to be coagulated in this process, the rubber particles in the radiation crosslinked rubber latex have already been crosslinked and thereby possess a certain gel content, which renders the adhesion or coagulation impossible during the coagulation process of the latex. Moreover, such particles can be dispersed uniformly in the uncrosslinked styrene-butadiene rubber. Therefore, in the finally obtained modified rubber component, the rubber particles having crosslinked structure as the dispersed phase have an average particle size also in the range of 20-500 nm, preferably 50-200 nm and more preferably 70-200 nm.

The modified rubber masterbatch of the present invention is produced by mixing the uncrosslinked rubber latex with the radiation crosslinked rubber latex in said weight ratio and coagulating them. During the preparation process, the equipment for mixing these two rubber latices in the mixing step is namely those commonly used mixing equipments in the art and may be selected from mechanical mixing equipments such as high speed mixer or kneader. The conditions and equipments for the coagulation of the latices are those commonly used for latex coagulation in the rubber industry.

The preparation of the rubber composition of the present invention comprises:

firstly producing the modified rubber component, i.e. crosslinking the rubber latex by radiation to enable the rubber particles in the latex to have crosslinked structure, then mixing the radiation crosslinked rubber latex with an uncrosslinked styrene-butadiene rubber latex in a commonly used mixing equipment and coagulating them by a coagulation process commonly used in the art for rubber latex, to produce the modified rubber component;

secondly compounding the modified rubber component, as the solid modifier, and uncrosslinked block base rubber, together with other additives conventionally used for rubber, by a rubber compounding process common in the rubber industry, to produce the rubber composition.

Concretely, the preparation process for the rubber composition of the present invention comprises the following steps:

(1) subjecting a rubber latex to the radiation crosslinking and thereby providing the rubber particles in the latex with a crosslinked structure, the said gel content and meanwhile an average particle size fixed in the said average particle size range, such as a range of 20 to 500 nm, preferably 50 to 200 nm, more preferably 70 to 200 nm;

(2) mixing till homogeneous the above radiation crosslinked rubber latex with a latex of the uncrosslinked styrene-butadiene rubber according to the said weight ratio of the rubber particles having crosslinked structure to the uncrosslinked styrene-butadiene rubber, wherein the weight ratio of solid content of the radiation crosslinked rubber latex to the solid content of the styrene-butadiene rubber latex is greater than 20:80 and less than or equal to 80:20, preferably 30:70-80:20 and more preferably 40:60-80:20;

(3) coagulating the above mixed latices to obtain the modified rubber component;

(4) compounding the modified rubber component obtained above in the said amount with a base rubber to produce the rubber composition, wherein the modified rubber component is present in an amount of 1 to 70 parts by weight, preferably 1 to 40 parts by weight and more preferably 1 to 30 parts by weight, relative to per 100 parts by weight of the base rubber.

The rubber composition of the present invention may further comprise filler commonly used in the rubber processing field. The following substances are the fillers especially suitable for preparing the compounded rubber and the vulcanized rubber of the present invention, including: carbon black, silica, metal oxides, silicates, carbonates, sulfates, hydroxides, glass fiber, glass microbead and the like or any mixture thereof. The metal oxide is preferably at least one selected from the group consisting of titanium oxide, alumina, magnesia, calcium oxide, barium oxide, zinc oxide and the like. The rubber composition of the present invention can also contain additives commonly used in the rubber processing and vulcanization, such as crosslinking agents, vulcanization accelerators, antioxidants, heat stabilizers, light stabilizers, ozone stabilizers processing aids, plasticizers, softeners, antiblocking agents, foaming agents, dyes, pigments, waxes, extenders, organic acids, flame retardants, and coupling agents and the like. The above additives are used in their conventional dosages which can be adjusted according to the practical situations.

The above various additives can be added when the modified rubber component, as the solid modifier, is compounded with the base rubber block, i.e. during the common rubber compounding process. Conventional equipment and process in rubber industry may be used, such as two roller mill, internal mixer, single-screw extruder, double-screw extruder, or the like.

The vulcanized rubber produced from the rubber composition of the present invention is obtained by compounding and vulcanizing the above rubber composition of the present invention using a vulcanization system and process conventionally used in the rubber field.

The production of the vulcanized rubber from the rubber composition of the present invention will not be influenced by the vulcanization system, and the vulcanization can be conducted in a normal sulfur vulcanization system or non-sulfur vulcanization system. The vulcanized rubber produced from the rubber composition of the present invention will not be influenced by the vulcanizing process, and the vulcanization may be plate vulcanization, injection molding vulcanization, vulcanization with vulcanizer, vulcanization by individual vulcanizing machines, salt bath vulcanization, fluid bed vulcanization, microwave vulcanization, high energy radiation vulcanization and the like.

The compounding and vulcanization processes for producing vulcanized rubber from the rubber composition of the present invention can be carried out by conventional processes and equipments in rubber industry, such as two roller mill, internal mixer, single-screw extruder, double-screw extruder, or the like.

Specifically, the modified rubber component of the present invention as described above is of a microcosmic phase status in which the uncrosslinked styrene-butadiene rubber is the continuous phase while the rubber particles having crosslinked structure is the dispersed phase with the fine particle size within the range of from 20 to 500 nm. The vulcanized rubber produced from the rubber composition obtained by compounding the modified rubber component and the base rubber still possesses the same microstructure, i.e. the rubber particles having crosslinked structure in the modified rubber component are dispersed in the rubber matrix still with the fine particle size of from 20 to 500 nm.

In the modified rubber component in the rubber composition of the present invention, since the particle size of the rubber particles in the rubber latex is fixed in range of the particle size of the initial latex particles by radiation crosslinking, the radiation crosslinked rubber particles act as the dispersed phase during the coagulating process and are uniformly dispersed with the fine particle size of from 20 to 500 nm in the uncrosslinked styrene-butadiene rubber. The vulcanized rubber produced from the rubber composition, which is obtained by compounding such modified rubber component, as the modifier, with base rubber, still possesses the same microstructure. That is to say, the rubber particles having crosslinked structure in the modified rubber component are dispersed in the rubber matrix still with the fine particle size of from 20 to 500 nm. It is such a micromorphology that allows the rubber particles having crosslinked structure to exert nano effect and solves the problem of covulcanizing different rubbers occurring in the vulcanization process, so that the vulcanized rubber produced from the rubber composition of the present invention possesses not only relatively low rolling resistance and outstanding wet skid resistance but also excellent wear resistance allowing the use as high performance tread rubber. In addition, the overall performance of the rubber composition can be adjusted by adding other additives according to the concrete requirements in practice on the above three parameters, thereby leaving larger room for producing vehicle tread rubbers meeting different performance requirements.

The preparation processes for rubber composition of the present invention and its vulcanized rubber can be practiced and operated easily with common process conditions in the art, and thus can be used in wide applications.

EMBODIMENTS FOR CARRYING OUT THE INVENTION

The following examples are provided for further demonstrating the present invention. However, the present invention is in no way limited thereto. The scope of the present invention is defined by the appended claims.

(I) The Experimental Data in the Examples are Determined Using the Following Equipments and Measuring Methods:

(1) Rolling resistance: RSS-II rubber rolling resistance test machine (from Beijing Rubberinfo Co. Ltd.) is used for determining the rolling power loss.

Under a given load, a wheel-shaped rubber specimen moving at a constant speed is allowed to move relatively to an intimately contacted wheel drum. The surface of the rubber specimen contacting the wheel drum distorts under the effect of the load, and the distortion degree gradually increases from the initial contacting point to the middle point and gradually decreases to zero from the middle point to the leaving point. Due to the different viscoelastic properties of various rubber formulations, the resultant force during the distortion from the initial contacting point to the middle point will be higher than the resultant force during the reversion from the middle point to the leaving point, and this force parallel to the loading force is namely the power loss value of the rubber specimen (J/r) and can be used for characterizing the rolling resistance of the rubber formulation.

Rolling resistance index (%): The rolling resistance value of a pure rubber is determined as a basis. The rolling resistance index is calculated as the percent of the measured values of other modified rubbers relative to the rolling resistance value of the pure rubber.

(2) Determination of wear resistance property: according to GB/T 1689-1998, the abrasion value of a vulcanized rubber is measured using a WML-76 model Akron abrasion tester.

The regulation of such a determination: A specimen is rubbed on a grinding wheel at a certain inclined angle under a certain load, and then the wear volume after certain distance is determined.

The wear volume is calculated as follows:

$$V = \frac{m_1 - m_2}{\rho}$$

wherein
V—Wear volume of the specimen, $cm^3$
$m_1$—Mass of the specimen before rubbing, g
$m_2$—Mass of the specimen after rubbing, g
$\rho$—Density of the specimen, $cm^3$ The wear index of the specimen is calculated as follows:

$$\text{wear index} = \frac{V_t}{V_s} \times 100\%$$

wherein
$V_s$—Wear volume of rubber with standard formulation.
$V_t$—Wear volume of modified rubber.

Wear index (%): The wear volume value of a pure rubber is determined as a basis. The wear index is calculated as the percent of the measured wear volume value of other modified rubber relative to that of the pure rubber.

(3) Determination of the dynamic mechanical properties (measurement of wet skid resistance): using a DMTA IV (dynamic mechanical thermal analyzer) from US Rheometric Scientific Corporation, with the test conditions of 10 Hz, 0.5% strain and ramp rate 2° C. per minute.

The friction of a rubber material on a wet surface is related to the hysteresis loss, and the wet skid resistance is generally characterized by tan δ at 0° C. A larger tan δ at 0° C. value indicates a better griping performance of the tyre on wet road.

Wet Skid Resistance Index (%):

The measured wet skid resistance value tan δ of a pure rubber is used as a basis, the wet skid resistance index is calculated as the percent of the measured wet skid resistance values of other modified rubbers relative to that of the pure rubber.

(4) Mechanical property: determined according to the related standard specifications.

(5) Determination of the gel content in the radiation crosslinked rubber latex: The latex, after being radiation crosslinked under certain conditions, is spray dried to produce a fully vulcanized powdery rubber. The gel content of the fully vulcanized powdery rubber is determined by a process disclosed in International patent application WO01/40356 (having a priority dated Dec. 3, 1999), which corresponds to the gel content of the radiation crosslinked rubber latex.

(II) Examples and Comparative Examples of the Modified Rubber Masterbatch and Emulsion Polymerized Styrene-Butadiene Rubber Composition Raw Materials:

Emulsion polymerized styrene-butadiene rubber latex SBR1502: a solid content of 20 wt %, styrene unit content of 23 wt %, a mooney viscosity of 50, available from the rubber plant of Qilu Petrochemical Corporation.

Emulsion polymerized styrene-butadiene rubber: block crude rubber with a brand of SBR1500, available from SHENHUA Chemical Industrial in Nantong.

Nitrile butadiene rubber latex: Brand: Nitrile-26, available from TIANYUAN Chemical Industrial in Zhaodong.

Carbon black: N234, available from TIANJIN DOLPHIN CARBON BLACK DEVELOPMENT CO. LTD.

Zinc oxide: commercially available.

Stearic acid: commercially available.

Sulfur: LUOZHUANG chemical plant in Linyi.

Accelerator TBBS: N-Tert-butyl-2-Benzothiazole sulfenamide, JINSHAN chemical plant in Zhengzhou.

Calcium chloride: commercially available.

Starch: commercially available.

Glycerol: commercially available.

5% carbolic acid solution: commercially available.

Process for Latex Coagulation:

A coagulating agent solution was formulated according to the formulation shown in table 1. Then the rubber latex was added to the coagulating agent solution in an amount equivalent to the weight of the coagulating agent solution. After stirring for 15 minutes, a solid rubber (crude rubber) was obtained by filtering, washing and drying.

TABLE 1

| Calcium chloride | Starch | Glycerol | 5 wt % carbolic acid solution | Water |
|---|---|---|---|---|
| 8 parts | 0.8 parts | 0.3 parts | 2 parts | q.s. to 100 parts of total weight of the coagulating agent solution |

Note:
the "parts" in table 1 denotes parts by weight

Preparation of the Compounded Rubber and Vulcanization Process:

Section I:

The operation was conducted in a Banbury mixer (A product of Farrel Bridge Corporation, UK) having a capacity of 1.57 L, rotor speed 80 r·$min^{-1}$. The concrete process comprised respectively adding the emulsion polymerized styrene-butadiene crude rubber or adding the modified rubber component of the present invention, and emulsion polymerized styrene-butadiene crude rubber, carbon black and other additives (except sulfur and accelerator), laying down the roof bolt and compounding for 3 minutes, and then discharging the rubber (at a temperature of 150-160° C.).

Section II:

After sulphur, accelerant were added to the compounded rubber as described above in section 1, the material was thinned through a XK-160 two roller mill (produced by Shang Hai Rubber Machinery Factory) for 6 times, then batched out. Then the mixture was vulcanized at 160° C. according to positive sulfuration time $T_{90}$, and thereafter a standard sample strip was made from vulcanized rubber sample. A variety of mechanic properties was tested, and the results were shown in table 3. The compounded rubber formulations were shown in table 2, in which the unit was part by weight.

Example 1

1. Preparation of the Modified Rubber Component (1) Preparation of the Radiation Crosslinked Nitrile Butadiene Rubber Latex:

A nitrile butadiene rubber latex (Nitrile-26) having a solid content of 45 wt % was added with a crosslinking additive trimethylolpropane triacrylate in an amount of 3 wt % relative to the solid content of the nitrile butadiene rubber latex. Then the mixture was subjected to radiation crosslinking at a radiation dose of 3.0 Mrad to prepare the radiation crosslinked nitrile butadiene rubber latex in which the average particle size of the radiation crosslinked nitrile butadiene rubber particles is 100 nm and the gel content is 91%.

(2) Mixing and Coagulation of the Latices:

The nitrile butadiene rubber latex after the radiation crosslinking was added in a certain solid content ratio into an uncrosslinked emulsion polymerized styrene-butadiene rubber latex SBR1502, wherein the weight ratio of the solid content in the radiation crosslinked nitrile butadiene rubber latex to the solid content in the uncrosslinked emulsion polymerized styrene-butadiene rubber latex was 50:50. After a high speed stirring in a stirrer for 15 minutes the coagulation was conducted according to the latex coagulation process as described above to produce a solid modified rubber component A. The composition of the coagulating agent solution was the same as shown in table 1.

2. Preparation of the Emulsion Polymerized Styrene-Butadiene Rubber Composition and its Vulcanized Rubber The modified rubber component A as obtained above, as modifier, was added together with other additives into the block crude rubber (emulsion polymerized styrene-butadiene rubber SBR1500) for compounding to produce a compounded rubber, the formulation of which (in parts by weight) was shown in table 2. The preparation process of the compounded rubber and the vulcanization process were the same as those described above. The vulcanized rubber specimen sheet was processed into standard specimen strips for measuring various mechanical properties. The results were shown in table 3.

Example 2

1. Preparation of the Modified Rubber Component

The preparation of the radiation crosslinked nitrile butadiene rubber latex and the mixing and coagulation of the latices were conducted according to the same process as that described in example 1, except that the weight ratio of the solid content of the radiation crosslinked nitrile butadiene rubber latex to the solid content of the uncrosslinked emulsion polymerized styrene-butadiene rubber latex was changed to 80:20. A solid modified rubber component B was obtained.

2. Preparation of the Emulsion Polymerized Styrene-Butadiene Rubber Composition and its Vulcanized Rubber The modified rubber component B as obtained above, as modifier, was added together with other additives into the block crude rubber (emulsion polymerized styrene-butadiene rubber SBR1500) for compounding to produce a compounded rubber, the formulation of which (in parts by weight) was shown in table 2. The preparation process of the compounded rubber and the vulcanization process were the same as those described above. The vulcanized rubber specimen sheet was processed into standard specimen strips for measuring various mechanical properties. The results were shown in table 3.

Comparative Example 1

A crude rubber of pure emulsion polymerized styrene-butadiene rubber (emulsion polymerized styrene-butadiene rubber SBR1500) was compounded and vulcanized according to the same compounding and vulcanization processes as those described in step 2 of example 1. The formulation of the compounded rubber of concrete rubber composition was listed in table 2. The properties of the vulcanized rubber were shown in table 3.

TABLE 2

Formulations of the comparative example and examples

| Material | Comparative example 1 | Example 1 | Example 2 |
|---|---|---|---|
| *SBR1500 | 100 | 95 | 96.25 |
| modified rubber component A | — | 5 | — |
| modified rubber component B | — | — | 3.75 |
| 3# carbon black | 50 | 50 | 50 |
| zinc oxide | 3 | 3 | 3 |
| stearic acid | 1 | 1 | 1 |
| sulfur | 1.75 | 1.75 | 1.75 |
| TBBS | 1 | 1 | 1 |
| sum | 156.75 | 156.75 | 156.75 |

TABLE 3

Main performances of the comparative example and examples

| Items | Comparative example 1 | Example 1 | Example 2 | Test Standards |
|---|---|---|---|---|
| Hardness (Shore A) | 70 | 69 | 67 | GB/T531.1-2008 |
| 300% stress/MPa | 18.0 | 18.2 | 17.4 | GB/T528-1998 |
| Tensile strength/MPa | 26.4 | 27.2 | 24.2 | GB/T528-1998 |
| Elongation at break/% | 407 | 422 | 386 | GB/T528 |
| Permanent deformation/% | 3 | — | 3 | GB/T528 |
| Compression fatigue temperature rise/° C. | 38.25 | 38.7 | 39 | GB/T1687-1993 |
| Rebound elasticity/% | 50 | 50 | 50 | GB/T1681-2009 |
| Rolling resistance index/% | 100 | 97.9 | 97.8 | — |
| Wear index/% | 100 | 82.1 | 84.9 | GB/T 1689-1998 |
| Wet skid resistance index/% | 100 | 106 | 116 | — |

As can be seen from the results shown in table 3, the vulcanized rubbers produced from the rubber composition of the present invention were improved simultaneously in rolling resistance index, wear index and wet skid resistance index, which enabled the produced vulcanized rubber to have not only lower rolling resistance and excellent wet skid resistance but also outstanding wear resistance. The reason was that the radiation crosslinked nitrile butadiene rubber particles having crosslinked structure were uniformly dispersed with the fine particle size of from 50 to 200 nm in the continuous phase of emulsion polymerized styrene-butadiene rubber matrix. Such characteristics of the rubber composition of the present invention render the rubber composition especially suitable for tread rubber. Since the three parameters in the "magic triangle" of the rubber composition of the present invention are all improved, it may be possible to modulate the comprehensive properties of the rubber composition by adding other additives in accordance with the concrete requirements of the actual applications on the three parameters, thereby leaving larger room for the production of tread rubbers meeting different property requirements.

(III) Examples and Comparative Examples of the Modified Rubber Masterbatch and Oil Extended Emulsion Polymerized Styrene-Butadiene Rubber Composition Raw Materials:

Emulsion polymerized styrene-butadiene rubber latex SBR1502: solid content of 20 wt %, styrene unit content of 23 wt %, mooney viscosity of 50, available from the rubber plant of Qilu Petrochemical Corporation.

Oil extended emulsion polymerized styrene-butadiene rubber: oil extended block crude rubber, with a brand of SBR1712, available from Qilu Petrochemical Corporation branch of China Petrochemical Corporation.

Nitrile butadiene rubber latex: with a brand of Nitrile-26, available from TIANYUAN Chemical Industrial in Zhaodong.

Carbon black: N234, available from TIANJIN DOLPHIN CARBON BLACK DEVELOPMENT CO. LTD.

Zinc oxide: commercially available.

Stearic acid: commercially available.

Sulfur: LUOZHUANG chemical plant in Linyi.

Accelerator TBBS: N-Tert-butyl-2-Benzothiazolesulfenamide, JINSHAN chemical plant in Zhengzhou.

Calcium chloride: commercially available.

Starch: commercially available.

Glycerol: commercially available.

5% carbolic acid solution: commercially available.

Process for Latex Coagulation:

A coagulating agent solution was formulated according to the formulation shown in table 4. Then the rubber latex was added to the coagulating agent solution in an amount equivalent to the weight of the coagulating agent solution. After stirring for 15 minutes, a solid rubber (crude rubber) was obtained by filtering, washing and drying.

TABLE 4

| Calcium chloride | Starch | Glycerol | 5 wt % carbolic acid solution | Water |
|---|---|---|---|---|
| 8 parts | 0.8 parts | 0.3 parts | 2 parts | q.s. to 100 parts of total weight of the coagulating agent solution |

Note:
the "parts" in table 4 denotes parts by weight

Preparation of the Compounded Rubber and Vulcanization Process:

Section I:

The operation was conducted in a Banbury mixer (A product of Farrel Bridge Corporation, UK) having a capacity of 1.57 L, rotor speed 80 r·min$^{-1}$. The concrete process comprised respectively adding the oil extended emulsion polymerized styrene-butadiene crude rubber or adding the modified rubber component of the present invention, and oil extended emulsion polymerized styrene-butadiene crude rubber, carbon black and other additives (except sulfur and accelerator), laying down the roof bolt and compounding for 3 minutes, and then discharging the rubber (at a temperature of 150-160° C.).

Section II:

After sulphur, accelerant were added to the compounded rubber as described above in section 1, the material was thinned through a XK-160 two roller mill (produced by Shang Hai Rubber Machinery Factory) for 6 times, then batched out. Then the mixture was vulcanized at 160° C. according to positive sulfuration time $T_{90}$, and thereafter a standard sample strip was made from vulcanized rubber sample. A variety of mechanic properties was tested, and the results were shown in table 6. The compounded rubber formulations were shown in table 5, in which the unit was part by weight.

Examples 3 and 4

1. Preparation of the Modified Rubber Masterbatch (1) Preparation of the Radiation Crosslinked Nitrile Butadiene Rubber Latex:

A nitrile butadiene rubber latex (Nitrile-26) having a solid content of 45 wt % was added with a crosslinking additive trimethylolpropane triacrylate in an amount of 3 wt % relative to the solid content of the nitrile butadiene rubber latex. Then the mixture was subjected to radiation crosslinking at a radiation dose of 3.0 Mrad to prepare the radiation crosslinked nitrile butadiene rubber latex in which the average particle size of the radiation crosslinked nitrile butadiene rubber particles is 100 nm and the gel content is 91%.

(2) Mixing and Coagulation of the Latices:

The nitrile butadiene rubber latex after the radiation crosslinking was added in a certain solid content ratio into an uncrosslinked emulsion polymerized styrene-butadiene rubber latex SBR1502, wherein the weight ratio of the solid content in the radiation crosslinked nitrile butadiene rubber latex to the solid content in the uncrosslinked emulsion polymerized styrene-butadiene rubber latex was 50:50. After a high speed stirring in a stirrer for 15 minutes the coagulation was conducted according to the latex coagulation process as described above to produce a solid modified rubber masterbatch A. The composition of the coagulating agent solution was the same as shown in table 4.

2. Preparation of the Oil Extended Emulsion Polymerized Styrene-Butadiene Rubber Composition and its Vulcanized Rubber The modified rubber masterbatch A as obtained above, as modifier, was added together with other additives into the block crude rubber (oil extended emulsion polymerized styrene-butadiene rubber SBR1712) for compounding to produce a compounded rubber, the formulation of which (in parts by weight) was shown in table 5. The preparation process of the compounded rubber and the vulcanization process were the same as those described above. The vulcanized rubber specimen sheet was processed into standard specimen strips for measuring various mechanical properties. The results were shown in table 6.

Examples 5 and 6

1. Preparation of the Modified Rubber Masterbatch

The preparation of the radiation crosslinked nitrile butadiene rubber latex and the mixing and coagulation of the latices were conducted according to the same process as that described in example 3, except that the weight ratio of the solid content of the radiation crosslinked nitrile butadiene rubber latex to the solid content of the uncrosslinked emulsion polymerized styrene-butadiene rubber latex was changed to 80:20. A solid modified rubber masterbatch B was obtained.

2. Preparation of the Oil Extended Emulsion Polymerized Styrene-Butadiene Rubber Composition and its Vulcanized Rubber The modified rubber masterbatch B as obtained above, as modifier, was added together with other additives into the block crude rubber (oil extended emulsion polymerized styrene-butadiene rubber SBR1712) for compounding to produce a compounded rubber, the formulation of which (in parts by weight) was shown in table 5. The preparation process of the compounded rubber and the vulcanization process were the same as those described above. The vulcanized rubber specimen sheet was processed into standard specimen strips for measuring various mechanical properties. The results were shown in table 6.

Comparative Example 2

An oil extended crude rubber of pure emulsion polymerized styrene-butadiene rubber (oil extended emulsion polymerized styrene-butadiene rubber SBR1712) was compounded and vulcanized according to the same compounding and vulcanization processes as those described in step 2 of example 3. The formulation of the compounded rubber of concrete rubber composition was listed in table 5. The properties of the vulcanized rubber were in table 6.

TABLE 5

Formulations of the comparative example and examples

| Material | Comparative example 2 | example 3 | example 4 | example 5 | example 6 |
|---|---|---|---|---|---|
| *SBR1712 | 100 | 100 | 100 | 100 | 100 |
| modified rubber component A | — | 11 | 16 | — | — |
| modified rubber component B | — | — | — | 7 | 10 |
| 3# carbon black | 50 | 50 | 50 | 50 | 50 |
| zinc oxide | 3 | 3 | 3 | 3 | 3 |
| stearic add | 1 | 1 | 1 | 1 | 1 |
| sulfur | 1.75 | 1.75 | 1.75 | 1.75 | 1.75 |
| TBBS | 1 | 1 | 1 | 1 | 1 |
| sum | 156.75 | 156.75 | 156.75 | 156.75 | 156.75 |

TABLE 6

Main performances of the comparative example and examples

| Items | Comparative example 2 | example 3 | example 4 | example 5 | example 6 | Test Standards |
|---|---|---|---|---|---|---|
| Hardness (Shore A) | 61 | 64 | 64 | 63 | 64 | GB/T531.1-2008 |
| 300% stress/MPa | 11.2 | 13.9 | 14.2 | 13.7 | 14.2 | GB/T528-1998 |
| Tensile strength/MPa | 20.2 | 19.6 | 20.1 | 20.1 | 18.8 | GB/T528-1998 |
| Elongation at break/% | 485 | 423 | 407 | 418 | 382 | GB/T528 |
| Permanent deformation/% | 17 | 11 | 13 | 14 | 9 | GB/T528 |
| Compression fatigue temperature rise/° C. | 33.4 | 35.6 | 34.2 | 33.9 | 33.8 | GB/T1687-1993 |
| Rebound elasticity/% | 39 | 40 | 39 | 39 | 39 | GB/T1681-2009 |
| Rolling resistance index/% | 100 | 94.3 | 93.9 | 97.6 | 95.8 | — |
| Wear index/% | 100 | 62.7 | 96.5 | 95.1 | 85.9 | GB/T 1689-1998 |
| Wet skid resistance index/% | 100 | 108 | 105 | 110 | 110 | — |

As can be seen from the results shown in table 6, the vulcanized rubbers produced from the rubber composition of the present invention were significantly improved simultaneously in rolling resistance index, wear index and wet skid resistance index, which enabled the produced vulcanized rubber to have not only lower rolling resistance and excellent wet skid resistance but also outstanding wear resistance. The reason was that the radiation crosslinked nitrile butadiene rubber particles having crosslinked structure were uniformly dispersed with the fine particle size of from 50 to 200 nm in the continuous phase of emulsion polymerized styrene-butadiene rubber matrix. Such characteristics of the rubber composition of the present invention render the rubber composition especially suitable for tread rubber. Since the three parameters in the "magic triangle" of the rubber composition of the present invention are all improved, it may be possible to modulate the comprehensive properties of the rubber composition by adding other additives in accordance with the concrete requirements of the actual applications on the three parameters, thereby leaving larger room for the production of tread rubbers meeting different property requirements.

(IV) Examples and Comparative Examples of the Modified Rubber Masterbatch and Polybutadiene Rubber Composition Raw Materials:

Emulsion polymerized styrene-butadiene rubber latex SBR1502: solid content of 20 wt %, styrene unit content of 23 wt %, a mooney viscosity of 50, available from the rubber plant of Qilu Petrochemical Corporation.

Polybutadiene rubber latex: with a brand of BR9000, available from Yanshan Petrochemical Corporation branch of China Petrochemical Corporation.

Nitrile butadiene rubber latex: with a brand of Nitrile-26, available from TIANYUAN Chemical Industrial in Zhaodong.

Carbon black: N234, available from TIANJIN DOLPHIN CARBON BLACK DEVELOPMENT CO. LTD.

Zinc oxide: commercially available.

Stearic acid: commercially available.

Sulfur: LUOZHUANG chemical plant in Linyi.

Accelerator TBBS: N-Tert-butyl-2-Benzothiazolesulfenamide, JINSHAN chemical plant in Zhengzhou.

Calcium chloride: commercially available.

Starch: commercially available.

Glycerol: commercially available.

5% carbolic acid solution: commercially available.

Process for Latex Coagulation:

A coagulating agent solution was formulated according to the formulation shown in table 7. Then the rubber latex was added to the coagulating agent solution in an amount equivalent to the weight of the coagulating agent solution. After stirring for 15 minutes, a solid rubber (crude rubber) was obtained by filtering, washing and drying.

TABLE 7

| Calcium chloride | Starch | Glycerol | 5 wt % carbolic acid solution | Water |
|---|---|---|---|---|
| 8 parts | 0.8 parts | 0.3 parts | 2 parts | q.s. to 100 parts of total weight of the coagulating agent solution |

Note:
the "parts" in table 7 denotes parts by weight

Preparation of the Compounded Rubber and Vulcanization Process:

Section I:

The operation was conducted in a Banbury mixer (A product of Farrel Bridge Corporation, UK) having a capacity of 1.57 L, rotor speed 80 r·min$^{-1}$. The concrete process comprised respectively adding the polybutadiene crude rubber or adding the modified rubber component of the present invention, and polybutadiene crude rubber, carbon black and other additives (except sulfur and accelerator), laying down the roof bolt and compounding for 3 minutes, and then discharging the rubber (at a temperature of 150-160° C.).

Section II:

After sulphur, accelerant were added to the compounded rubber as described above in section 1, the material was thinned through a XK-160 two roller mill (produced by Shang Hai Rubber Machinery Factory) for 6 times, and batched out. Then the mixture was vulcanized at 160° C. according to positive sulfuration time $T_{90}$, and thereafter a standard sample strip was made from vulcanized rubber sample. A variety of mechanic properties was tested, and the results were shown in table 9. The compounded rubber formulations were shown in table 8, in which the unit was part by weight.

Example 7

1. Preparation of the Modified Rubber Masterbatch (1) Preparation of the Radiation Crosslinked Nitrile Butadiene Rubber Latex:

A nitrile butadiene rubber latex (Nitrile-26) having a solid content of 45 wt % was added with a crosslinking additive trimethylolpropane triacrylate in an amount of 3 wt % relative to the solid content of the nitrile butadiene rubber latex. Then the mixture was subjected to radiation crosslinking at a radiation dose of 3.0 Mrad to prepare the radiation crosslinked nitrile butadiene rubber latex in which the average particle size of the radiation crosslinked nitrile butadiene rubber particles is 100 nm and the gel content is 91%.

(2) Mixing and Coagulation of the Latices:

The nitrile butadiene rubber latex after the radiation crosslinking was added in a certain solid content ratio into an uncrosslinked emulsion polymerized styrene-butadiene rubber latex SBR1502, wherein the weight ratio of the solid content in the radiation crosslinked nitrile butadiene rubber latex to the solid content in the uncrosslinked emulsion polymerized styrene-butadiene rubber latex was 80:20. After a high speed stirring in a stirrer for 15 minutes the coagulation was conducted according to the latex coagulation process as described above to produce a solid modified rubber masterbatch. The composition of the coagulating agent solution was the same as shown in table 7.

2. Preparation of the Polybutadiene Rubber Composition and its Vulcanized Rubber The modified rubber masterbatch as obtained above, as modifier, was added together with other additives into the block crude rubber (polybutadiene rubber BR9000) for compounding to produce a compounded rubber, the formulation of which (in parts by weight) was shown in table 8. The preparation process of the compounded rubber and the vulcanization process were the same as those described above. The vulcanized rubber specimen sheet was processed into standard specimen strips for measuring various mechanical properties. The results were shown in table 9.

Comparative Example 3

A pure polybutadiene crude rubber (polybutadiene rubber BR9000) was compounded and vulcanized according to the same compounding and vulcanization processes as those described in step 2 of example 7. The formulation of the compounded rubber of concrete rubber composition was listed in table 8. The properties of the vulcanized rubber were in table 9.

TABLE 8

Formulations of the comparative example and example

| Material | Comparative example 3 | Example 7 |
|---|---|---|
| *BR9000 | 100 | 100 |
| modified rubber masterbatch | — | 10 |
| 3# carbon black | 50 | 50 |
| zinc oxide | 3 | 3 |

TABLE 8-continued

Formulations of the comparative example and example

| Material | Comparative example 3 | Example 7 |
|---|---|---|
| stearic acid | 1 | 1 |
| sulfur | 1.75 | 1.75 |
| TBBS | 1 | 1 |
| sum | 156.75 | 156.75 |

TABLE 9

Main performances of the comparative example and example

| Items | Comparative example 3 | Example 7 | Test Standards |
|---|---|---|---|
| Hardness (Shore A) | 58 | 59 | GB/T531.1-2008 |
| 300% stress/MPa | 9.70 | 10.8 | GB/T528-1998 |
| Tensile strength/MPa | 14.9 | 15.2 | GB/T528-1998 |
| Elongation at break/% | 416 | 372 | GB/T528 |
| Permanent deformation/% | 6 | 2 | GB/T528 |
| Compression fatigue temperature rise/° C. | 39.7 | 39.2 | GB/T1687-1993 |
| Rebound elasticity/% | 55 | 55 | GB/T1681-2009 |
| Wear index/% | 100 | 124 | GB/T 1689-1998 |
| Wet skid resistance index/% | 100 | 112 | — |
| Rolling resistance index/% | 100 | 98.8 | — |

As can be seen from the results shown in table 9, the polybutadiene rubber per se shows excellent wear resistance, but inadequate wet skid resistance. The rubber composition of the present invention maintained the good wear resistance of the polybutadiene rubber and further remarkably increased the wet skid resistance index, meanwhile lowering the rolling resistance, which enabled the produced vulcanized rubber to have not only lower rolling resistance and excellent wet skid resistance but also outstanding wear resistance. The reason was that the radiation crosslinked nitrile butadiene rubber particles having crosslinked structure were uniformly dispersed with the fine particle size of from 50 to 200 nm in the continuous phase of polybutadiene rubber matrix. Such characteristics of the rubber composition of the present invention are especially suitable for tread rubber. It may be possible to modulate the comprehensive properties of the rubber composition by adding other additives in accordance with the concrete requirements of the actual applications on the three parameters, thereby leaving larger room for the production of tread rubbers meeting different property requirements.

(V) Examples and Comparative Examples of the Modified Rubber Masterbatch and Solution Polymerized Styrene-Butadiene Rubber Composition Raw Materials:

Emulsion polymerized styrene-butadiene rubber latex SBR1502: solid content of 20 wt %, styrene unit content of 23 wt %, a mooney viscosity of 50, available from the rubber plant of Qilu Petrochemical Corporation.

Solution polymerized styrene-butadiene rubber produced by solution polymerization process: block crude rubber with a brand of T2000R, Available from SHANGHAI GAOQIAO Petrochemical Corporation branch of China Petrochemical Corporation.

Nitrile butadiene rubber latex: with a brand of Nitrile-26, available from TIANYUAN Chemical Industrial in Zhaodong.

Carbon black: N234, available from TIANJIN DOLPHIN CARBON BLACK DEVELOPMENT CO. LTD.

Zinc oxide: commercially available.

Stearic acid: commercially available.

Sulfur: LUOZHUANG chemical plant in Linyi.

Accelerator TBBS: N-Tert-butyl-2-Benzothiazolesulfenamide, JINSHAN chemical plant in Zhengzhou.

Calcium chloride: commercially available.

Starch: commercially available.

Glycerol: commercially available.

5% carbolic acid solution: commercially available.

Process for Latex Coagulation:

A coagulating agent solution was formulated according to the formulation shown in table 10. Then the rubber latex was added to the coagulating agent solution in an amount equivalent to the weight of the coagulating agent solution. After stirring for 15 minutes, a solid rubber (crude rubber) was obtained by filtering, washing and drying.

TABLE 10

| Calcium chloride | Starch | Glycerol | 5 wt % carbolic acid solution | Water |
|---|---|---|---|---|
| 8 parts | 0.8 parts | 0.3 parts | 2 parts | q.s. to 100 parts of total weight of the coagulating agent solution |

Note:
the "parts" in table 10 denotes parts by weight

Preparation of the Compounded Rubber and Vulcanization Process:

Section I:

The operation was conducted in a Banbury mixer (A product of Farrel Bridge Corporation, UK) having a capacity of 1.57 L, rotor speed 80 r·min$^{-1}$. The concrete process comprised respectively adding the solution polymerized styrene-butadiene crude rubber or adding the modified rubber component of the present invention, and solution polymerized styrene-butadiene crude rubber, carbon black and other additives (except sulfur and accelerator), laying down the roof bolt and compounding for 3 minutes, and then discharging the rubber (at a temperature of 150-160° C.).

Section II:

After sulphur, accelerant were added to the compounded rubber as described above in section 1, the material was thinned through a XK-160 two roller mill (produced by Shang Hai Rubber Machinery Factory) for 6 times, then batched out. Then the mixture was vulcanized at 160° C. according to positive sulfuration time $T_{90}$, and thereafter a standard sample strip was made from vulcanized rubber sample. A variety of mechanic properties was tested, and the results were shown in table 12. The compounded rubber formulations were shown in table 11, in which the unit was part by weight.

Example 8

1. Preparation of the Modified Rubber Component (1) Preparation of the Radiation Crosslinked Nitrile Butadiene Rubber Latex:

A nitrile butadiene rubber latex (Nitrile-26) having a solid content of 45 wt % was added with a crosslinking additive trimethylolpropane triacrylate in an amount of 3 wt % relative to the solid content of the nitrile butadiene rubber latex. Then the mixture was subjected to radiation crosslinking at a radiation dose of 3.0 Mrad to prepare the radiation crosslinked nitrile butadiene rubber latex in which the average particle size of the radiation crosslinked nitrile butadiene rubber particles is 100 nm and the gel content is 91%.

(2) Mixing and Coagulation of the Latices:

The nitrile butadiene rubber latex after the radiation crosslinking was added in a certain solid content ratio into an uncrosslinked emulsion polymerized styrene-butadiene rubber latex SBR1502, wherein the weight ratio of the solid content in the radiation crosslinked nitrile butadiene rubber latex to the solid content in the uncrosslinked emulsion polymerized styrene-butadiene rubber latex was 80:20. After a high speed stirring in a stirrer for 15 minutes the coagulation was conducted according to the latex coagulation process as described above to produce a solid modified rubber component 1. The composition of the coagulating agent solution was the same as shown in table 10.

2. Preparation of the Solution Polymerized Styrene-Butadiene Rubber Composition and its Vulcanized Rubber The modified rubber component as obtained above, as modifier, was added together with other additives into the block crude rubber (solution polymerized styrene-butadiene rubber T2000R) for compounding to produce a compounded rubber, the formulation of which (in parts by weight) was shown in table 11. The preparation process of the compounded rubber and the vulcanization process were the same as those described above. The vulcanized rubber specimen sheet was processed into standard specimen strips for measuring various mechanical properties. The results were shown in table 12.

Comparative Example 4

A pure solution polymerized styrene-butadiene crude rubber (solution polymerized styrene-butadiene rubber T2000R) was compounded and vulcanized according to the same compounding and vulcanization processes as those described in step 2 of example 8. The formulation of the compounded rubber of concrete rubber composition was listed in table 11. The properties of the vulcanized rubber were shown in table 12.

TABLE 11

Formulations of the comparative example and example

| Material | Comparative example 4 | Example 8 |
| --- | --- | --- |
| *T2000R | 100 | 91.25 |
| modified rubber component1 | — | 8.75 |
| 3# carbon black | 50 | 50 |
| zinc oxide | 3 | 3 |
| stearic acid | 1 | 1 |
| sulfur | 1.75 | 1.75 |
| TBBS | 1 | 1 |
| sum | 156.75 | 156.75 |

TABLE 12

Main performances of the comparative example and example

| Items | Comparative example 4 | Example 8 | Test Standards |
| --- | --- | --- | --- |
| Hardness (Shore A) | 66 | 68 | GB/T531.1-2008 |
| 300% stress/MPa | 17.0 | — | GB/T528-1998 |
| Tensile strength/MPa | 22.7 | — | GB/T528-1998 |
| Elongation at break/% | 375 | 346 | GB/T528 |
| Compression fatigue temperature rise/° C. | 41.4 | 37.3 | GB/T1687-1993 |
| Rebound elasticity/% | 56 | 55 | GB/T1681-2009 |
| Wear index/% | 100 | 94.9 | GB/T 1689-1998 |
| Wet skid resistance index/% | 100 | 133 | — |
| Rolling resistance index/% | 100 | 100 | |

As can be seen from the results shown in table 12, the solution polymerized styrene-butadiene rubber per se shows excellent rolling resistance. The rubber composition of the present invention maintained the low rolling resistance of the solution polymerized styrene-butadiene rubber and further increased the wear index and wet skid resistance index, which enabled the produced vulcanized rubber to have not only lower rolling resistance and excellent wet skid resistance but also outstanding wear resistance. The reason was that the radiation crosslinked nitrile butadiene rubber particles having crosslinked structure were uniformly dispersed with the fine particle size of from 50 to 200 nm in the continuous phase of solution polymerized styrene-butadiene rubber matrix. Such characteristics of the rubber composition of the present invention are especially suitable for tread rubber. It may be possible to modulate the comprehensive properties of the rubber composition by adding other additives in accordance with the concrete requirements of the actual applications on the three parameters, thereby leaving larger room for the production of tread rubbers meeting different property requirements.

The invention claimed is:

1. A modified rubber masterbatch, consisting of an uncrosslinked rubber and rubber particles having radiation crosslinked structure dispersed therein, wherein the rubber particles having radiation crosslinked structure are synthetic rubber particles and/or natural rubber particles with an average particle size of 20 to 500 nm, and a gel content of 60% by weight or higher, and the uncrosslinked rubber is a styrene-butadiene rubber; and wherein the weight ratio of the rubber particles having radiation crosslinked structure to the uncrosslinked rubber is greater than 20:80 and less than or equal to 80:20.

2. The modified rubber masterbatch according to claim 1, characterized in that the rubber particles having radiation crosslinked structure are one or more selected from the group consisting of natural rubber particles, styrene-butadiene rubber particles, carboxylated styrene-butadiene rubber particles, nitrile butadiene rubber particles, carboxylated nitrile butadiene rubber particles, chloroprene rubber particles, polybutadiene rubber particles, silicone rubber particles, acrylic rubber particles, and styrene-butadiene-vinylpyridine rubber particles.

3. The modified rubber masterbatch according to claim 1, characterized in that the rubber particles having radiation crosslinked structure are of homogeneous structure.

4. The modified rubber masterbatch according to claim 1, characterized in that the weight ratio of the rubber particles having radiation crosslinked structure to the uncrosslinked rubber is 30:70-80:20.

5. The modified rubber masterbatch according to claim 1, characterized in that the modified rubber masterbatch is obtained by mixing the components comprising the uncrosslinked rubber latex and a latex of the rubber particles having radiation crosslinked structure till homogeneous and then coagulating them, wherein the latex of the rubber particles having radiation crosslinked structure is a rubber latex obtained by radiation crosslinking.

6. A preparation process for the modified rubber masterbatch according to claim 1, comprising the following steps:
   (1) subjecting a latex of synthetic rubber and/or natural rubber to the radiation crosslinking and thereby providing the synthetic rubber and/or natural rubber particles in the latex with a crosslinked structure, the said gel content and meanwhile an average particle size fixed in the said average particle size range;
   (2) mixing till homogeneous the above radiation crosslinked latex of the synthetic rubber and/or natural rubber with a latex of the uncrosslinked rubber according to the said weight ratio of the rubber particles having radiation crosslinked structure to the uncrosslinked rubber;
   (3) coagulating the above mixed latices to obtain the said modified rubber masterbatch.

7. The preparation process according to claim 6, characterized in that the latex of synthetic rubber and/or natural rubber latex is one or more selected from the group consisting of natural rubber latex, styrene-butadiene rubber latex, carboxylated styrene-butadiene rubber latex, nitrile butadiene rubber latex, carboxylated nitrile butadiene rubber latex, chloroprene rubber latex, polybutadiene rubber latex, silicone rubber latex or acrylic rubber latex, styrene-butadiene-vinylpyridine rubber latex and the like.

8. A rubber composition, comprising a blend of the modified rubber masterbatch according to claim 1 and a base rubber, wherein the modified rubber masterbatch is present in an amount of 1 to 70 parts by weight, relative to per 100 parts by weight of the base rubber.

9. The rubber composition according to claim 8, characterized in that the base rubber is one or more selected from the group consisting of natural rubber, modified natural rubber, and synthetic rubber.

10. A preparation process for the rubber composition according to claim 8, comprising a step of compounding the modified rubber masterbatch and the base rubber in the said amounts to obtain a rubber composition.

11. The preparation process according to claim 10, characterized in that the preparation process for the modified rubber masterbatch comprising the following steps:
   (1) subjecting a latex of synthetic rubber and/or natural rubber to the radiation crosslinking and thereby providing the synthetic rubber and/or natural rubber particles in the latex with a crosslinked structure, the said gel content and meanwhile an average particle size fixed in the said average particle size range;
   (2) mixing till homogeneous the above radiation crosslinked latex of the synthetic rubber and/or natural rubber with a latex of the uncrosslinked rubber according to the said weight ratio of the rubber particles having radiation crosslinked structure to the uncrosslinked rubber;
   (3) coagulating the above mixed latices to obtain the said modified rubber masterbatch.

12. A vulcanized rubber produced from the rubber composition according to claim 8.

13. The modified rubber masterbatch according to claim 1, wherein the rubber particles having radiation crosslinked structure are synthetic rubber particles and/or natural rubber particles with an average particle size of 50 to 200 nm.

14. The modified rubber masterbatch according to claim 13, wherein the rubber particles having radiation crosslinked structure are synthetic rubber particles and/or natural rubber particles with an average particle size of 70 to 200 nm.

15. The modified rubber masterbatch according to claim 1, wherein the rubber particles having radiation crosslinked structure are synthetic rubber particles and/or natural rubber particles with a gel content of 75% by weight or higher.

16. The modified rubber masterbatch according to claim 1, characterized in that the rubber particles having radiation crosslinked structure are one or more selected from the group consisting of nitrile butadiene rubber particles, styrene-butadiene-vinylpyridine rubber particles, styrene-butadiene rubber particles, and carboxylated styrene-butadiene rubber particles.

17. The modified rubber masterbatch according to claim 1, characterized in that the rubber particles having radiation crosslinked structure are one or more selected from the group consisting of styrene-butadiene-vinylpyridine rubber particles and nitrile butadiene rubber particles.

18. The modified rubber masterbatch according to claim 1, characterized in that the rubber particles having radiation crosslinked structure nitrile butadiene rubber particles.

19. The modified rubber masterbatch according to claim 1, characterized in that the weight ratio of the rubber particles having radiation crosslinked structure to the uncrosslinked rubber is 40:60-80:20.

20. The preparation process according to claim 6, characterized in that the latex of synthetic rubber and/or natural rubber latex is one or more selected from the group consisting of nitrile butadiene rubber latex, styrene-butadiene-vinylpyridine rubber latex, styrene-butadiene rubber latex, and carboxylated styrene-butadiene rubber latex.

21. The preparation process according to claim 20, characterized in that the latex of synthetic rubber and/or natural rubber latex is one or more selected from the group consisting of styrene-butadiene-vinylpyridine rubber latex and nitrile butadiene rubber latex.

22. The preparation process according to claim 21, characterized in that the latex of synthetic rubber and/or natural rubber latex is nitrile butadiene rubber latex.

23. The rubber composition of claim 8, wherein the modified rubber masterbatch is present in an amount of 1 to 40 parts by weight relative to per 100 parts by weight of the base rubber.

24. The rubber composition of claim 23, wherein the modified rubber masterbatch is present in an amount of 1 to 30 parts by weight relative to per 100 parts by weight of the base rubber.

25. The rubber composition of claim 8, characterized in that the base rubber is one or more selected from the group consisting of natural rubber, solution polymerized styrene-butadiene rubber or its oil extended products, emulsion polymerized styrene-butadiene rubber or its oil extended products, and polybutadiene rubber or its oil extended products.

26. The rubber composition of claim 25, characterized in that the base rubber is one or more selected from the group consisting of solution polymerized styrene-butadiene rubber or its oil extended products, emulsion polymerized styrene-butadiene rubber or its oil extended products, and polybutadiene rubber or its oil extended products.

* * * * *